United States Patent [19]

Faulstich

[11] 3,970,466
[45] July 20, 1976

[54] CHEMICALLY STABLE OPTICAL GLASS
[75] Inventor: Marga Faulstich, Mainz, Germany
[73] Assignee: Jenaer Glaswerk Schott & Gen., Mainz, Germany
[22] Filed: July 18, 1975
[21] Appl. No.: 597,092

[30] Foreign Application Priority Data
July 24, 1974  Germany............................ 2435555

[52] U.S. Cl................................. 106/54; 106/47 Q
[51] Int. Cl.² ........................ C03C 3/10; C03C 3/08; C03C 3/04
[58] Field of Search .................. 106/47 Q, 47 R, 54

[56] References Cited
UNITED STATES PATENTS
3,740,242   6/1973   Faulstich et al. ................ 106/47 Q Primary Examiner—Winston A. Douglas
Assistant Examiner—Mark Bell
Attorney, Agent, or Firm—Millen, Raptes & White

[57] ABSTRACT

Optical glass, $nd = 1.650 \pm 2 \times 10^{-3}$ and $vd = 55.5 \pm 1.0$, having a high chemical stability and a sufficiently low tendency toward crystallization that it can be manufactured in a continuous tank melting process into gobs, pressed components, and other formed articles as a mass-produced glass, said glass consisting essentially of, in percent by weight:

| | |
|---|---|
| $SiO_2$ | 33.0 ± 0.5 |
| $B_2O_3$ | 11.6 ± 0.5 |
| BaO | 36.6 ± 1.0 |
| $La_2O_3$ | 14.0 ± 2.5 |
| $ZrO_2$ | 4.0 ± 2.5 |
| $As_2O_3$ or $Sb_2O_3$ | 0 − 0.5. |

6 Claims, No Drawings

CHEMICALLY STABLE OPTICAL GLASS

BACKGROUND OF THE INVENTION

This invention relates to an optical glass of the optical position nd (refraction index) = $1.650 \pm 2 \times 10^{-3}$ and vd (Abbe number) = $55.5 \pm 1.0$.

Glasses of this optical position are conventional; however heretofore, all of these glasses had a very low chemical stability. Consequently, there were restrictions on their manufacture and application.

SUMMARY OF THE INVENTION

An object of this invention is to provide an optical glass of the optical position $nd = 1.650 \pm 2 \times 10^{-3}$, $vd = 55.5 \pm 1.0$ having a high chemical stability and a sufficiently low tendency toward crystallization that it can be manufactured by a continuous tank melting method into gobs, pressed articles, and block glass of any desired form as a mass-produced glass.

Other objects are to provide starting glass composition intermediates in the production of and/or process to produce said optical glasses.

Upon further study of the specification and appended claims, further objects and advantages of this invention will become apparent to those skilled in the To attain these objects, it has been discovered that the desired optical glasses can be produced on the basis of a glass having the following composition (in percent by weight):

| | |
|---|---|
| $SiO_2$ | $33.0 \pm 0.5$ |
| $B_2O_3$ | $11.6 \pm 0.5$ |
| BaO | $36.6 \pm 1.0$ |
| $La_2O_3$ | $14.0 \pm 2.5$ |
| $ZrO_2$ | $4.0 \pm 2.5$ |
| $As_2O_3$ or $Sb_2O_3$ | 0 – 0.5 as refining agent |
| preferably nd = | $1.650 \pm 1 \times 10^{-3}$ |
| preferably vd = | $55.0 \pm 0.5$ |

The glass of the present invention has the following properties:

the coefficient of expansion $\alpha \times 10^7/°C$. between 20° and 300° C. is $74 \pm 2$;

the transformation temperature is $683 \pm 5°C$.;

the softening temperature at $10^{7.65}$ poises is $810 \pm 10°C$;

the specific gravity is $3.78 \pm 0.10$.

The chemical resistance is 2–3 classes better than that of the glasses on the market which have this optical position, i.e., La K22 nd = 1.6511 vd = 55.89. The chemical resistance test was conducted in accordance with the acid resistance and spotting tendency tests customary with Schott, as described in the Schott pocket catalogue No. 3050 of 1972.

The crystallization test shows, after a tempering of 60 minutes in a gradient furnace, no devitrification in the glass and only on the surface in isolated instances a crystallization growth rate of <0.3 μ/min. The test was conducted according to O. H. Grauer and E. H. Hamilton: "Improved Apparatus for Determination of Liquidus Temperatures and Rates of Crystal Growth in Glasses," J. Research Natl. Bur. Standards, 44 (5) 495–502 (1950); RP 2096.

The following table shows examples of glasses according to the invention in percentages by weight:

| Oxides | Example 1 | Example 2 | Example 3 |
|---|---|---|---|
| $SiO_2$ | 33.4 | 32.8 | 33.0 |
| $B_2O_3$ | 11.0 | 11.6 | 11.6 |
| BaO | 37.1 | 36.6 | 36.6 |
| $La_2O_3$ | 12.7 | 15.0 | 15.8 |
| $ZrO_2$ | 4.8 | 3.8 | 3.0 |
| $Sb_2O_3$ | 0.2 | 0.2 | 0.2 |
| nd | 1.651 | 1.651 | 1.651 |
| vd | 54.5 | 55.1 | 55.9 |
| Density s | 3.75 | 3.76 | 3.73 |
| Cryst. growth | 0.3 | 0.3 | 0.15 |
| Acid resistance glass f | 4 | 4 | 4 |

Example 3 with an Abbe-number vd of 55.9 at a refraction index nd of 1.651 represents a particularly preferred embodiment of the invention.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

For a glass according to Example 3 a blended batch of 300 kg. is formulated as follows:

EXAMPLE 3

| WEIGHED-IN QUANTITY | |
|---|---|
| Raw Materials | kg. |
| $SiO_2$ | 99.15 |
| $H_3BO_3$ | 61.81 |
| $Ba(NO_3)_2$ | 33.96 |
| $BaCO_3$ | 116.03 |
| $La_2O_3$ | 47.64 |
| $ZrO_2$ | 9.08 |
| $Sb_2O_3$ | 0.60 as refining agent |

The batch is well mixed together. The thus-mixed blend is melted in a continuous tank at about 1350°C, refined in the refining section of the tank at 1380° – 1400°C and stirred in the discharge section up to 1160°C. The melt is discharged through a platinum pipe at between 1100° and 1020°C (viscosity 250–$10^3$ poise) and is worked into gobs, bars, pressed elements or blocks.

The preceding example can be repeated with similar success by substituting the generically or specifically described invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Optical glass, $nd = 1.650 \pm 2 \times 10^{-3}$ and $vd = 55.5 \pm 1.0$, having a high chemical stability and a sufficiently low tendency toward crystallization that it can be manufactured in a continuous tank melting process into gobs, pressed components, and other formed articles as a mass-produced glass, said glass consisting essentially of, in percent by weight:

| | |
|---|---|
| $SiO_2$ | $33.0 \pm 0.5$ |
| $B_2O_3$ | $11.6 \pm 0.5$ |
| BaO | $36.6 \pm 1.0$ |

-continued

| | |
|---|---|
| $La_2O_3$ | $14.0 \pm 2.5$ |
| $ZrO_2$ | $4.0 \pm 2.5$ |
| $As_2O_3$ or $Sb_2O_3$ | $0 - 0.5$. |

2. An optical glass according to claim 1, wherein $nd = 1.650 \pm 1 \times 10^{-3}$.

3. An optical glass according to claim 1, wherein $vd = 55.0 \pm 0.5$.

4. An optical glass according to claim 2, wherein $vd = 55.0 \pm 0.5$.

5. A glass composition consisting essentially of, in percent by weight:

| | |
|---|---|
| $SiO_2$ | $33.0 \pm 0.5$ |
| $B_2O_3$ | $11.6 \pm 0.5$ |
| $BaO$ | $36.6 \pm 1.0$ |
| $La_2O_3$ | $14.0 \pm 2.5$ |
| $ZrO_2$ | $4.0 \pm 2.5$ |
| $As_2O_3$ or $Sb_2O_3$ | $0 - 0.5$ |

6. A glass composition according to claim 4, having the following properties:
the coefficient of expansion $\alpha \times 10^{-7}/°$ C. between 20° and 300° C. is $74 \pm 2$;
the transformation temperature is $683 \pm 5°$ C;
the softening temperature at $10^{7.65}$ poises is $810 \pm 10°$ C.;
the specific gravity is $3.78 \pm 0.05$.

* * * * *